United States Patent [19]

Overbeck

[11] Patent Number: 5,551,151
[45] Date of Patent: Sep. 3, 1996

[54] METHOD OF MAKING A VARIABLE OFF-SET FULL FACE WHEEL

[75] Inventor: Joseph C. Overbeck, Lansing, Mich.

[73] Assignee: Motor Wheel Corporation, Lansing, Mich.

[21] Appl. No.: 453,226

[22] Filed: May 30, 1995

Related U.S. Application Data

[62] Division of Ser. No. 165,079, Feb. 10, 1993, Pat. No. 5,380,071.

[51] Int. Cl.$^6$ ..................................................... B23P 19/00
[52] U.S. Cl. ........................................................ 29/894.322
[58] Field of Search ................... 29/894.32, 894.321, 29/894.322, 894.323; 301/63.1, 64.2, 64.3

[56] References Cited

U.S. PATENT DOCUMENTS

| Re. 19,010 | 11/1933 | Smith. |
|---|---|---|
| 1,399,410 | 12/1921 | Stafford. |
| 1,684,398 | 9/1928 | Johnston. |
| 1,815,821 | 7/1931 | Baker. |
| 1,850,344 | 3/1932 | Eksergian. |
| 1,850,345 | 3/1932 | Eksergian. |
| 1,984,169 | 12/1934 | Wyant et al.. |
| 1,994,557 | 3/1935 | Zerk. |
| 2,003,109 | 5/1935 | Farr. |
| 2,041,656 | 5/1936 | Hight. |
| 2,049,052 | 7/1936 | Eksergian. |
| 2,083,325 | 6/1937 | Farr. |
| 2,120,631 | 6/1938 | Sinclair. |
| 2,150,810 | 3/1939 | Slick. |
| 2,257,684 | 9/1941 | Hecht. |
| 3,506,311 | 4/1970 | Nobach. |
| 4,256,347 | 3/1981 | Reppert. |
| 4,279,287 | 7/1981 | Daudi et al.. |
| 4,354,407 | 10/1982 | Daudi et al.. |
| 4,511,183 | 4/1985 | Spiegel et al.. |
| 4,610,482 | 9/1986 | Overbeck et al.. |
| 4,645,267 | 2/1987 | Weld. |
| 4,646,434 | 3/1987 | Daudi. |
| 4,659,148 | 4/1987 | Grill. |
| 4,733,448 | 3/1988 | Daudi. |
| 4,917,440 | 4/1990 | Daudi. |
| 5,098,272 | 3/1992 | Joseph et al.. |
| 5,188,429 | 2/1993 | Heck et al.. |

FOREIGN PATENT DOCUMENTS

| 2235619 | 7/1972 | Germany. |
|---|---|---|
| 3007911 | 3/1980 | Germany. |
| 200218 | 9/1938 | Switzerland. |
| 357790 | 9/1930 | United Kingdom. |
| 411636 | 6/1934 | United Kingdom. |
| 445642 | 4/1936 | United Kingdom. |
| 453876 | 9/1936 | United Kingdom. |

OTHER PUBLICATIONS

Prior Art Drawings FIGS. A and B illustrating American Racing Equipment of Rancho Dominguez, California, Part No. 72–4604 No Date.

*Primary Examiner*—P. W. Echols
*Attorney, Agent, or Firm*—Barnes, Kisselle, Raisch, Choate, Whittemore & Hulbert, P.C.

[57] ABSTRACT

In one method of making the wheel the parts are temporarily assembled in a fixture with the connector flanges movably engaged with one another, and the center part is precision located relative to the rim in a predetermined orientation relative to the rim bead seats by bodily shifting of the center part as and if necessary relative to the rim to accomplish such alignment. The parts are then permanently assembled in fixed relationship while so located by permanently securing the connector flanges together in a non-take-apart mode to provide a final predetermined permanently fixed orientation of the center part relative to the rim bead seats.

8 Claims, 5 Drawing Sheets

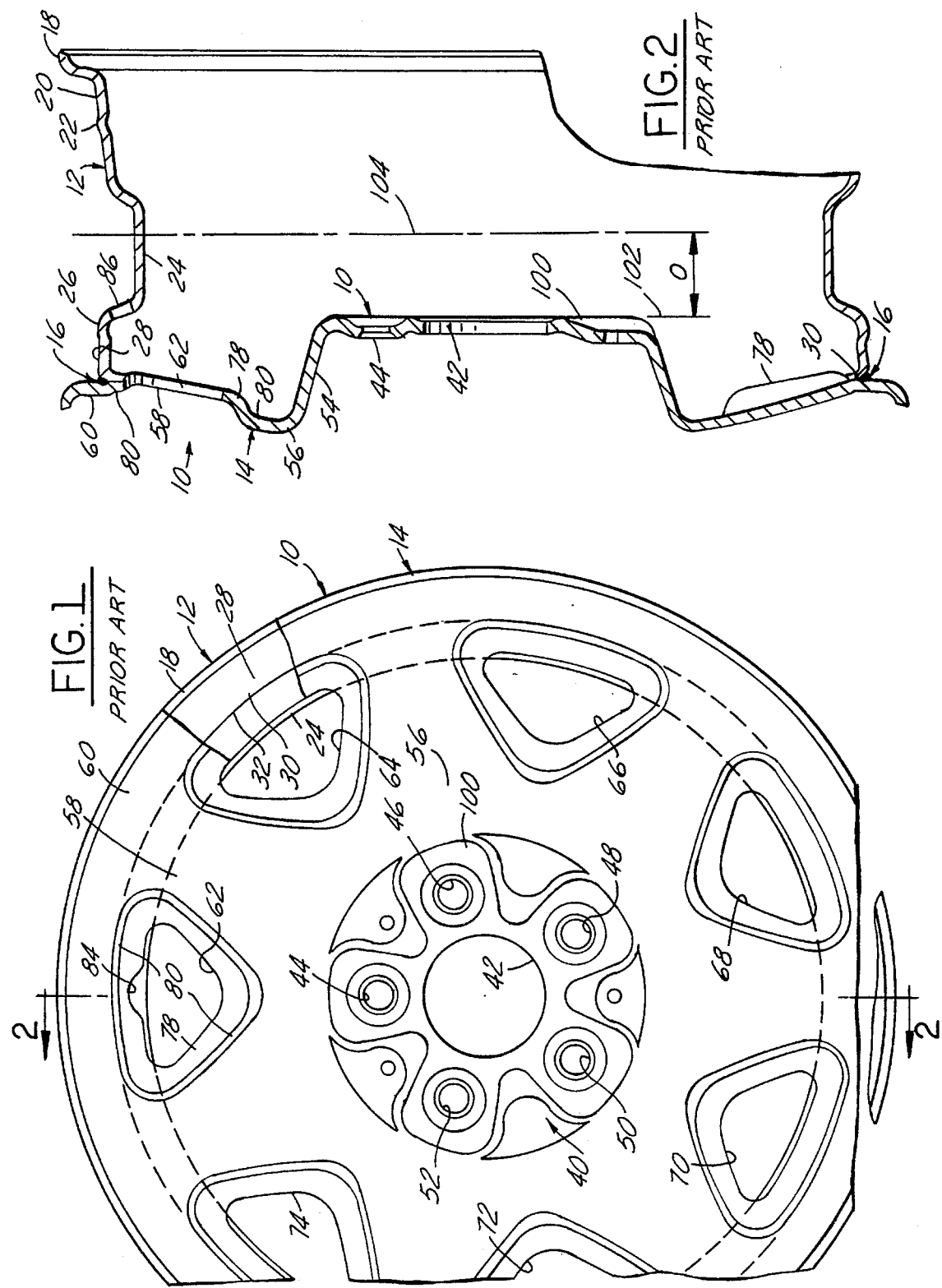

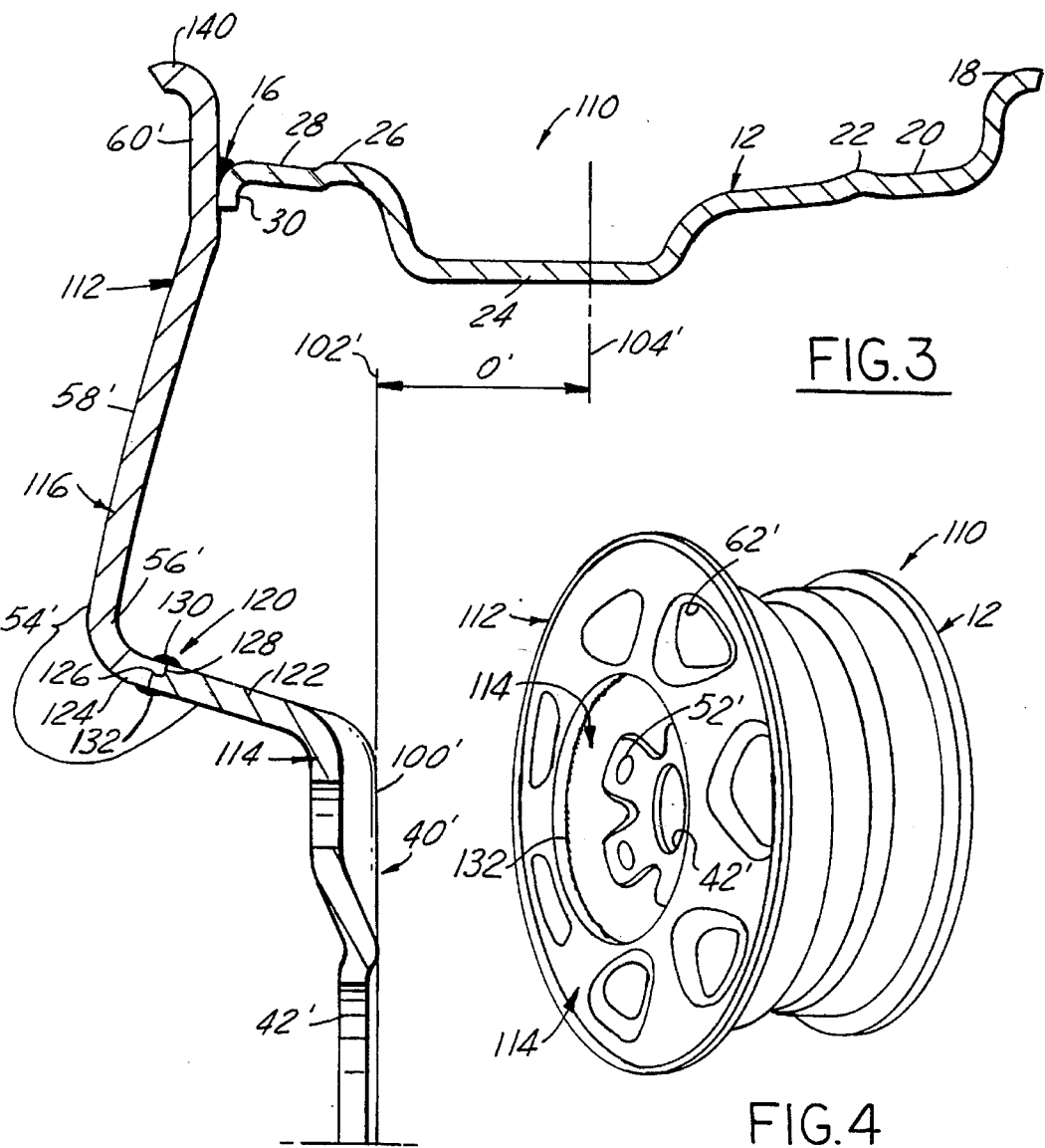
FIG.3
FIG.4
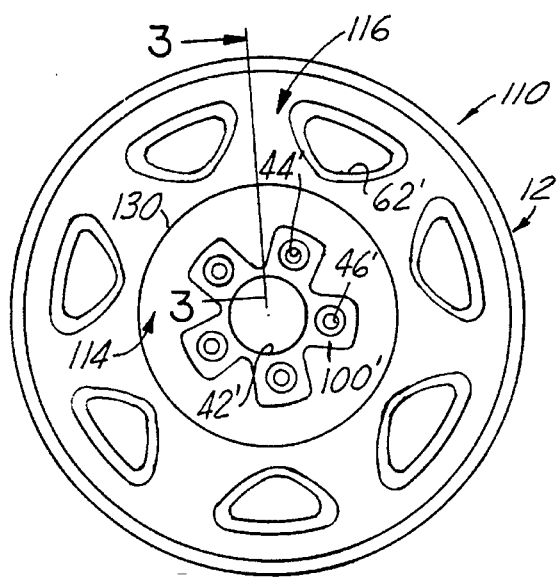
FIG.5

METHOD OF MAKING A VARIABLE OFF-SET FULL FACE WHEEL

This is a divisional of application Ser. No. 08/165,079, filed Feb. 10, 1993, now U.S. Pat. No. 5,380,071.

FIELD OF THE INVENTION

The present invention relates to vehicle wheels, and more particularly to automotive passenger vehicle wheels of the so-called "full-face" type in which at least the wheel disc is fabricated from sheet metal, such as steel or aluminum and methods for manufacture thereof.

BACKGROUND OF THE INVENTION

For well over sixty years, wheels for automotive passenger vehicles (which includes light trucks as well as passenger cars) adapted for button-hook mounting of pneumatic tires thereon have been fabricated from sheet metal, usually steel, to provide a rolled one-piece rim with a drop-center well to which is affixed a disc (also variously termed "body", "spider", "web" or "center") adapted for mounting the wheel to the hub or other wheel mounting part of the vehicle. Usually the rim is made with both inboard and outboard bead seats and associated tire bead retaining flanges, and the disc is secured to the base of the drop-center well of the rim. Such wheels are well suited for use with tubeless tires and are in extensive use today as so-called "base wheels" or "plain-Jane" wheels utilizing discs of relatively simple, standardized shape. Although more costly highly stylized deep drawn discs have been successfully used since the 1960's to enhance the appearance of such wheels (so-called "styled wheels"), because of the limited opportunity to provide varying appearance and in order to reduce manufacturing cost, removably attached decorative hub caps, wheel covers and/or trim rings have been provided at additional cost as retail customer add-on options to enhance the appearance of "plain Jane" wheels.

Such wheels may also be aesthetically enhanced if used as a "backbone" of composite plastic and sheet metal styled wheels such as those extensively commercialized and sold under the trademark "POLYCAST" by the assignee of applicants herein, Motor Wheel Corporation, Lansing, Mich. Such wheels have a decorative plastic body permanently affixed to the outboard (also variously termed "street-side", "curb-side" or "beauty-side") of the sheet metal "backbone", as set forth in more detail, for example, in Joseph U.S. Pat. No. 5,098,272 and the patents cited therein, and assigned to the assignee herein, Motor Wheel Corporation of Lansing, Mich.

Another effort to enhance the appearance of automotive wheels has been the development of aluminum styled wheels made by such processes as sand casting, permanent die casting, forging, etc., and finished by machining. Such wheels may have the outboard tire bead seat and retaining flange joined integrally with the disc, to impart a so-called "full-face look", and this portion in turn also joined integrally with the remainder of the rim inboard half in a one-piece wheel assembly, or may be made as a two-piece wheel assembly united by welding as exemplified by the Motor Wheel Nobach U.S. Pat. No. 3,506,311. Although such aluminum full-face styled wheels have gained increased popularity in the last decade, they represent a relatively costly solution to the problem of enhancing wheel styling.

A more recent passenger vehicle wheel development, initiated in the 1980's by Motor Wheel Corporation, is the so-called "full-face" sheet metal (e.g. steel) wheel, wherein the disc is a fabricated sheet metal part that extends generally radially outwardly around its outer periphery to also form the outboard tire bead retaining flange to achieve the full-face appearance. A modified dual-bead-seat, single bead-retaining-flange type rim is formed adjacent its outboard edge to provide the outboard bead seat, and the rim free edge is formed to provide a radially in-turned flange which is welded to the inboard face of the full-face disc part. A commercially successful example of such a full-face wheel is that disclosed and claimed in U.S. Pat. No. 4,610,482, to Overbeck et al., also assigned to the assignee herein. Such sheet metal full-face wheels enable the wheel designer to provide a more unique full-face styling appearance to the outboard face of the wheel at lower cost than cast or forged aluminum wheels, while also eliminating the need, associated with plain-Jane wheels, for attaching ornamental wheel covers and their attendant problems and cost.

These full-face sheet metal wheels of the Overbeck et al U.S. Pat. No. 4,610,482 also meet the increased off-set requirement of front wheel drive systems while at the same time providing weight savings over the aforementioned plain-Jane or base wheel type construction. They also satisfy such other demanding parameters as a strong, reliable airtight circumferential weld joint and a two-piece wheel assembly capable of meeting severe fatigue life specifications required on current O.E.M. automotive vehicle wheels. Many millions of such wheels have been made and sold and are currently in use on automotive passenger vehicles (both passenger cars and light trucks) of both U.S. and foreign manufacture.

As is well understood in the art, the manufacture of such full-face wheels utilizing the one-piece wheel disc/outboard rim flange part, as with high volume wheel disc manufacture in general, requires complex and costly tooling and associated fixtures and transfer equipment and also involves substantial manufacturing processing cost in maintaining such progressive die forming equipment. Many forming stages as well as subsequent manufacturing operations are often required to transform the flat circular sheet metal starting blank into the various configurations, contours and openings involved in providing the central bolt circle wheel mounting portion of the disc, the "window" or "beauty-section" of the disc which extends radially outwardly of the wheel from the center mounting portion, and in the case of full-face wheels, the reversely curved outer edge portion which forms the outboard tire bead retaining flange of the disc.

Also, the design and manufacture of one-piece wheel discs in general require proper material selection and design of the disc blank for cold work stamping and drawing operations. The initial stock thickness must be uniform throughout the blank to permit economical utilization of lower cost sheet metal starting material. The sheet metal starting material chosen, i.e., mild carbon or HSLA steel, aluminum or magnesium, must meet manufacturing formability requirements and strength and flexure characteristics capable of satisfying the severe fatigue load specifications of current automotive passenger vehicle wheels. Since the cyclical stress levels imposed on the wheel during use vary significantly as between the various portions of the wheel disc, both the foregoing disc blank parameters as well as the ultimate cross-sectional configuration and contours of the wheel disc must be selected and designed to accommodate the fatigue life requirements of the most highly stressed areas. This can result in "material overdesign" with respect to the fatigue life requirements of the lower stressed areas of the disc, and the ensuing cost and weight penalties. These considerations also apply to full-face one-piece disc engineering design.

In addition, even for a given style full-face or other type disc wheel design, the need sometimes arises to accommodate variations in bolt circle layout (e.g. number and size) and variations in center hole sizes and configurations. This too can result in high tooling change costs and lead times to make, install and try-out such tooling modifications.

One distinguishing characteristic of such prior full-face aluminum and sheet metal wheel constructions, wherein the one-piece disc provides the outboard tire-bead-retaining flange, is that they have a fixed (non-variable) wheel off-set for any particular full-face wheel part design. By contrast, a "plain-Jane" or "base wheel" construction, because of the telescopic-type press-fit and welded attachment of the peripheral disc flange to the drop-center well of the dual bead rim, permits off-set specifications for a given wheel part to be varied relatively easily without changing the other parameters of the given wheel design, even though reduced brake clearance of such wheel types remains a limitation. Hitherto, if a given full-face wheel design were desired to be retained unchanged, and yet adapted to fit different models of a vehicle having differing wheel off-set requirements, the configuration of the one-piece disc/outboard rim flange part of the wheel had to be re-designed in order to shift the wheel mounting plane relative to the wheel rim. With a sheet metal full-face disc, this in turn entailed a re-tooling of the progressive die cold forming equipment utilized in the transfer press to make this part, thereby incurring the tooling change costs and long lead times involved in the manufacture of such modified tooling as well as in the installation and try-out of the same. This was true even in those instances where the wheel disc/outboard rim flange part was not to be noticably changed in its outboard appearance from the styling standpoint.

Accordingly, it is an object of the present invention to provide an improved full-face wheel construction which permits a wide range of wheel offset variations to be accomplished at reduced cost and without necessarily changing the outboard appearance of the styling area of the full face wheel, and which enables greater optimization of the strength-to-weight ratio of the part, permits heat conductivity to be varied with the parts of the disc construction and allows greater styling variations and by eliminating the need to select a single starting material for the entire wheel disc, while also satisfying the aforementioned wheel manufacturing and wheel product requirements of full-face wheels.

Another object of the present invention is to provide an improved method for making a full-face vehicle wheel construction of the aforementioned character in an economical uniform and reliable manner.

BRIEF DESCRIPTION OF THE DRAWINGS

Other objects, as well as features and advantages of the present invention, will become apparent from the following detailed description taken in conjunction with the accompanying drawings (which are scaled from engineering drawings unless otherwise noted), wherein:

FIG. 1 is a fragmentary elevational view of the outboard side of a prior art full-face wheel construction as disclosed in the aforementioned Overbeck et al U.S. Pat. No. 4,610, 482;

FIG. 2 is a central, radial cross-sectional view taken on the line 2—2 of FIG. 1 better illustrating the one-piece wheel disc/outboard rim flange part of the prior art full-face wheel construction of FIG. 1;

FIG. 3 is a fragmentary radial cross-sectional view of a first embodiment of a full-face wheel construction in accordance with the present invention, taken on the line 3—3 of FIG. 5;

FIG. 4 is a perspective view of a complete wheel constructed in accordance with the embodiment of FIG. 3, as viewed from the outboard side of the wheel;

FIG. 5 is an elevational view of the wheel of FIGS. 3 and 4 as viewed from the inboard side of the wheel;

DESCRIPTION OF PRIOR ART CONSTRUCTION

Figure 6:
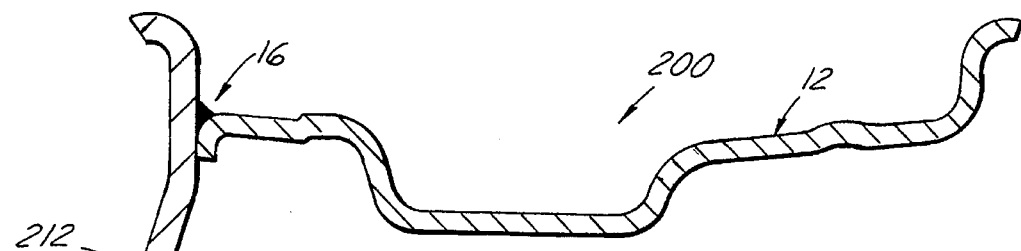
FIG. 6 is a fragmentary radial cross-sectional view of a second embodiment of the wheel construction of the invention, taken on the line 6—6 of FIG. 8.

Referring in more detail to the accompanying drawings, and by way of background to a better understanding of the present invention, one embodiment of a wheel 10 made in accordance with a preferred method and wheel construction of the prior art is shown in FIGS. 1 and 2. Wheel 10 comprises one embodiment of a two-piece-wheel assembly as shown and described by way of example in the Overbeck et al U.S. Pat. No. 4,610,482, and comprises a one-piece rim part 12 and a one-piece disc-rim flange part 14 permanently and securely joined together by a circumferentially continuous, air impermeable weld joint 16. Rim 12 is preferably made from strip steel stock by coiling, butt welding and roll forming in a conventional manner so as to provide, as best seen in FIG. 2, an inboard tire bead retaining flange 18, an inboard tire bead seat 20, a safety hump 22, a drop-center well portion 24, an outboard bead seat safety hump 26 and an outboard tire bead seat 28. However, instead of being a "full rim" having an outboard tire-bead retaining flange, rim 12 has at its outboard free edge a radially in-turned flange portion 30 in accordance with the aforementioned Overbeck et al '482 patent, which is incorporated herein by reference.

The one-piece disc 14 of wheel 10 comprises a central "bolt circle" wheel mounting portion 40 having a pilot center opening 42 hitherto preferably made by a so-called "pierce-after" or other "form-after assembly" operation, such as drilling, boring, reaming, etc. Wheel 10 may have opening 42 concentric with the average axis of wheel bead seats 20 and 28 or with a predetermined controlled eccentricity relative to the rim bead seats for tire-wheel match-mounting purposes in accordance with the Daudi et al U.S. Pat. Nos. 4,279,287 and 4,354,407, also assigned to the assignee herein and incorporated herein by reference. Wheel mounting bolt holes 44, 46, 48, 50 and 52 have also preferably been made in the pierce-after or other form-after operation, and are arranged in a circular array in mounting portion 40 concentric with opening 42. Disc 14 also has an intermediate portion in the form of a frusto-conical, hat section 54 integral with and extending radially outwardly and axially outboard from mounting portion 40 defining a crown portion 56. Crown portion 56 which often is the most highly stressed area of the disc, merges integrally with a vent opening or "window" portion 58 which in turn extends further radially outwardly and merges integrally with an outer peripheral portion of disc 14 in the form of an outboard tire bead retaining flange 60. It will thus be seen that the one-piece disc 14 serves as a so-called "full-face" disc-rim flange part in that it does not terminate at a junction with the drop-center well 24 of rim 12, but rather continues radially outwardly beyond the rim outboard free edge to provide the outboard tire bead retaining flange 60 of rim and wheel assembly 10 to thereby achieve the "full face look" at the outboard or beauty-side of wheel 10.

The primary zone utilized by the wheel stylist to effect variations in wheel styling is the aforementioned intermediate and outer peripheral portions 54–60 of disc 14. Thus, disc 14 is provided with an annular array of seven styled vent holes 62, 64, 66, 68, 70, 72 and 74 formed in window portion 56. A valve stem notch 84 is also provided in disc portion 56 which is aligned with a valve stem hole 86 in rim 12.

After rim part 12 has been final roll formed, and disc 14 stamped to final form (but for bolt holes 14–52 and pilot hole 42), each in separate operations, rim 12 is fixtured with edge flange portion 30 in abutment with the inboard surface of disc flange 60 in a suitable assembly fixture of a welding machine such that the parts assume the relative position shown in FIG. 2. Assembly of wheel 10 is completed by permanently affixing rim 12 to disc 14 by forming a circumferentially continuous arc weld joint 16 in the "trench" or asymmetrical groove defined between the outboard sloping surface of flange portion 30 and the inboard surface of flange portion 60 (FIG. 2). The weld joint 16 so-formed is preferably a full penetration flare bevel arc weld joint so as to securely join the rim and disc together and form an air-tight seal at the junction of these parts. As will be well understood by those skilled in the art, the weld metal bead of the weld joint 16 is indicated somewhat schematically in FIG. 2 inasmuch as the same when illustrated in cross-section in a micrograph would preferably correspond closely to such illustration of the weld joint as shown in FIG. 3 of the aforementioned Overbeck et al '482 patent.

Bolt holes 44–50 are offset in conventional fashion in an outboard direction from the mounting pad portions 100 disposed circumferentially intermediate the bolt holes. Mounting pads 100 define a circumferentially array of inboard abutment surfaces disposed in a radial plane, indicated by the line numbered 102 in FIG. 2, and are adapted to abut to a wheel hub, brake hub or other wheel mounting structure of the vehicle in accordance with conventional practice. The "center line" of wheel 10 is indicated by line 104 in FIG. 2 and is defined as a radial plane spaced equidistant from tire bead retaining flanges 18 and 60 of wheel 10. The "offset" of wheel 10 as illustrated in FIG. 2 is thus the dimension indicated at "O" in a direction axially of wheel 10, and is the distance between the radial planes 104 and 102.

Hitherto, if the outboard look of the prior art wheel 10 having offset dimension O were desired to be retained but the same fitted to a vehicle having a different offset requirement, the wheel engineer would have to re-design the contour of disc 14 so as to shift the mounting portion 40 to move its mounting pads 100 as needed to produce the changed offset dimension. However, this produced some alteration in the outboard appearance of the wheel, and also required the retooling of the progressive forming, die stamping and draw tooling in each of the multiple stations of the progressive forming transfer press utilized for making the disc-rim part. Because this would entail substantial lead time requirements and considerable tooling design, construction, installation and try-out costs, such a desired offset change in many instances was rendered economically impractical.

One prior method of overcoming this problem of changing the offset in the full face disc is that disclosed and claimed in copending application Ser. No. 07/940,502, filed Sep. 4, 1992, in the names of Ross S. Hill and Charles E. Kier, Jr., and assigned to the assignee of record herein. Although highly useful and advantageous in obtaining a limited range of changed wheel offset dimensions, this prior method is not capable of obtaining as wide a range of offsets as that provided by the present invention, nor of achieving the remaining objects and attendant advantages of the present invention.

SUMMARY OF TEE INVENTION

In general, the present invention achieves the aforementioned objects by making the full-face wheel disc initially as only two separate parts, one part serving as the center mounting portion of the disc and the other part the remainder of the disc, with these two separately made parts then being permanently interconnected to form the completed full-face wheel disc. Variations in wheel offset and/or center hole and mounting bolt holes are economically obtained by merely changing the design of only the center mounting part of the disc. This feature, as well as further cooperative features described hereinafter, of the improved full-face wheel construction of the invention enables the wheel designer to better optimize the form, function and manufacturability of each of these respective areas of the overall disc, as well as enhancing overall wheel uniformity and performance, and reducing full face wheel cost.

DETAILED DESCRIPTION EMBODIMENTS OF TEE INVENTION

First Embodiment

Referring in more detail to the accompanying drawings, FIGS. 3–5 illustrate a first exemplary embodiment of a wheel 110 made in accordance with the method and construction of the present invention. Wheel 110 comprises a three piece assembly made up of the previously described rim 12 of prior art wheel 10, and a two-piece disc 112 made up of a center mounting portion part 114 and an outer portion part 116. By way of example, the two part disc 112 provides many of the same structural features and geometry as the prior disc 14, and hence these features are indicated by corresponding reference numerals raised by a prime suffix and the description thereof not repeated.

The design, construction and location of the permanent interconnection between the two disc parts 114 and 116 of disc 112, in accordance with one principal feature of the present invention, takes into account the fact that in the full-face wheel 10 the mounting portion 40 versus the window portion 58 of disc 14 each must perform separate and in some sense conflicting functions even though together they must share the common function of serving as the load bearing support between the vehicle and rim 12 and the tubeless pneumatic tire carried thereon (not shown), and to transmit such severe and cyclical loading via the wheel hub or other wheel mounting vehicle part to which wheel 110 is removably attached by the usual wheel fasteners (not shown).

Thus in wheel 110 a permanent connection, designated generally as joint 120, is provided between parts 114 and 116 which is located in the frusto-conical hat section 54' radially inwardly and inboard of the crown portion 56' in a zone of uniform frusto-conical geometry of disc 112. Joint 120 includes an outwardly divergent frusto-conical flange 122 on center part 114, and an inwardly convergent frusto-conical flange 124 on outer part 116. The outboard edge 126 of flange 122 and the inboard edge 128 of flange 124 are each suitably separately machined to interfit with one another to form a stepped dove tail butt joint between parts 114 and 116. Joint 120 also includes an inboard weld bead 130 and outboard weld bead 132 (indicated semi-schematically in FIG. 3) aligned respectively with the radially outer and inner, axially staggered seams of the dove tail joint. Preferably welds 130 and 132 are circumferentially continuous and formed by M.I.G. welding techniques.

In the manufacture of wheel 110 the three wheel parts, namely rim 12, disc mounting part 114 and disc outer part 116, are each separately mass produced to their separate but interrelated specifications. Rim 12 is made as set forth with respect to the prior art wheel 10 of FIGS. 1 and 2. Both of the disc parts 114 and 116 are preferably manufactured on conventional high production rate progressive die and draw stamping tooling provided in an automated transfer press operation. However, since disc 112 is of two-part construction, the differing tooling required to produce the respective parts 114 and 116 may be greatly simplified over that required to form the one piece disc 14 of the prior art wheel 10 because parts 114 and 116 individually are much simpler in shape than the overall configuration of the entire disc. Also, for this reason formability of the materials selected is less critical. The wide cone angle of flanges 122 and 124 also makes these parts easier to stamp and draw.

In the method of making wheel 110, outer part 116 is finished formed in the progressive stamping and drawing operation except for the outer edge portion 140 of flange 60' which, in the as-stamped condition, typically will have a slight outwardly divergent flare angle. The final configuration of the edge 140 as shown in FIG. 3 may be imparted by a machining operation to appropriately shape the flange edge for balance weight retention and tire mounting.

Mounting part 114 of the wheel 110 is also separately finished formed except for bolt holes 44–52 and center pilot hole 42'.

Then disc parts 114 and 116 are fixtured and permanently connected at joint 120 by forming the welds 130 and 132 as indicated previously. Next the disc subassembly 114–116 and rim 12 are suitably fixtured in a welding machine in their relative positions indicated in FIG. 3 and the foregoing weld joint 16 is formed to join rim 12 to disc 112 to provide a full face wheel construction also embodying the invention of the aforementioned Overbeck et al '482 patent.

The assembled wheel 110 is then further processed in a pierce-after operation in accordance with the aforementioned Daudi et al '287 and '407 patents to precisely form and locate the bolt holes and center pilot opening relative to one another as well as to the rim bead seats. If desired, this operation can be combined with a coining and sizing stage to more precisely form and locate mounting surfaces 100' and thereby insure parallelism of planes 102' and 104' and more precise control of the offset dimension O'. The respective disc and rim valve holes 80 and 86 may also be formed in an after-assembly operation.

From the foregoing description it will now be apparent that wheel 110 embodies a two-part disc construction of the invention which overcomes the aforementioned problems of the one-piece disc 14 of the full face prior art wheel 10. Mounting part 114 may be designed as desired to have longer or shorter flanges 122 to thereby readily vary the offset dimension O' of wheel 110 as needed with relatively simple and inexpensive tooling changes, as will be well understood by those skilled in the art. It will also be understood that, if it is necessary to keep the diametrical dimension of the zone of the mounting pads 100' of part 114 constant, a longer length of flange 122 will require a shallower cone angle of the same, as well as a slight change in the curvature of flange 124 to mate with flange 122 when utilizing the construction of joint 120 illustrated in FIG. 3. Alternatively, flange 124 may remain unchanged and the edges 126 and 128 of flanges 122 and flange 124 suitably machined to accommodate the resultant difference in cone angles between flanges 122 and 124.

In addition, since center mounting part 114 initially is made as a separate part, other variations in the design and construction of this part of the wheel can be accomplished as needed to meet differing vehicle requirements, such as variations in the size, location and number of bolt holes in the bolt circle. Changes in the size and configuration of the center pilot opening 42' likewise can be readily accomplished. In each instance only minor re-tooling costs need be incurred because of the simplicity of part 114 relative to that of the entire disc 112.

The two-part disc construction also provides much greater flexibility in the selection and optimization of material types and thicknesses as between center part 114 and outer part 116. For example, if it is desired to better isolate the outer part 116 of disc 112 from heat generated during vehicle braking, as when using wheel 110 for a "backbone" in "POLYCAST" wheel constructions, part 114 may be made from a metal material having a lower heat conductivity, e.g., stainless steel, than that selected for use in part 116. Conversely, the aesthetic effects of the wheel 110 can be enhanced by utilizing a material such as stainless steel in part 116 whereas part 114 may be made of lower cost mild carbon or HSLA steel. Other aesthetic and/or protective treatments of the outboard face of outer part 116, such as plating, coating, etc., are facilitated by the ability to perform such operations on part 116 separately from part 114 prior to assembly of these parts.

It is also to be understood that the portion of the outboard face of wheel 10 radially inwardly of crown 56', i.e., the central mounting area of the wheel, is often conventionally provided with a removable decorative hub cap. The outboard weld bead 132 thus would normally be covered in use of the wheel, and the inboard weld 130 is not visible to the user of the wheel when mounted to a vehicle. Hence the outboard appearance in this central area of the wheel is often generally immaterial to the finished appearance of the outboard side of the full face wheel.

Additionally, the stock thickness of the material of the respective starting blanks employed in the stamping of center part 114 versus outer part 116 can be different and hence better optimized to meet the functional requirements of each of these differing zones in the wheel disc. This design flexibility imparted to the disc construction thereby permits better optimization of the strength-to-weight ratio of the overall wheel as well as significant savings in material costs.

Second Embodiment

Figure 7:
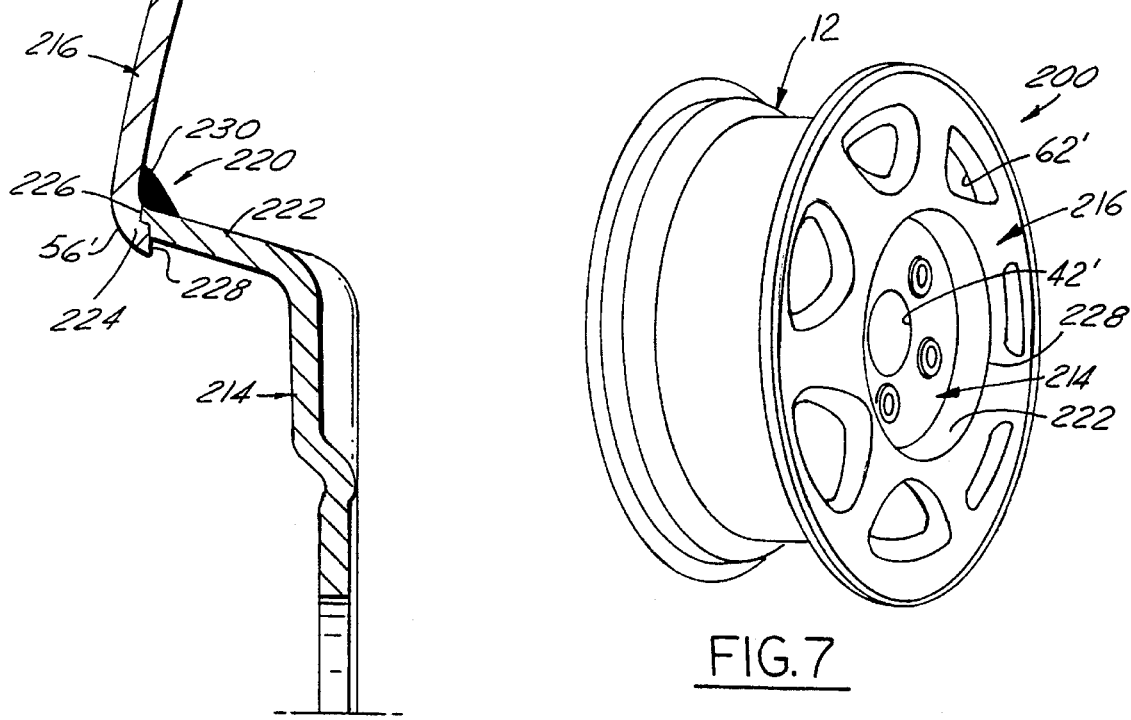
FIG. 7 is a perspective view of the complete wheel constructed in accordance with the second embodiment of FIG. 6, as viewed from the outboard side of the wheel.
Figure 8:
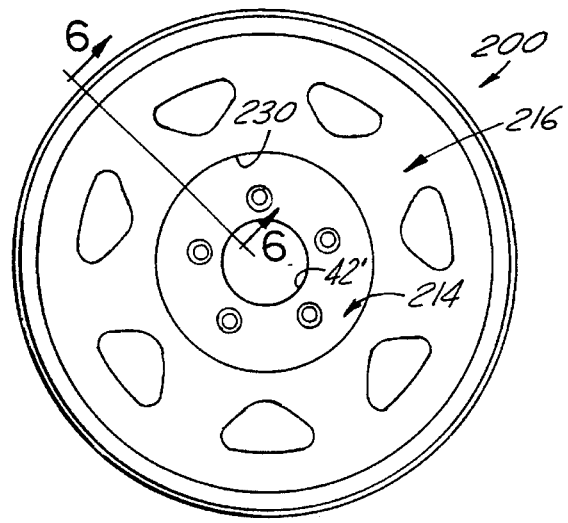
FIG. 8 is an elevational view of the wheel of FIGS. 6 and 7 as viewed from the inboard side of the wheel.

FIGS. 6, 7 and 8 illustrate an exemplary second embodiment wheel 200 also made in accordance with the method and construction of the present invention. Wheel 200 is a three-piece assembly of rim 12 and a two-part disc 212 generally similar to a disc 112 of wheel 110 and is constructed in generally the same manner.

Wheel 200 differs from wheel 112 primarily in the construction of the joint 220 between central mounting part 214 and disc outer part 216. Joint 220, like joint 120, is a dove tail butt joint with the end face 226 of center part flange 222 and the end face 228 of outer part flange 224 machined complimentarily to form the overlapping shoulders of the dove tail joint. However, in-turned flange 224 of outer part 216 is made shorter in length than flange 124 of wheel 110 so that the joint 220 is located generally at, instead of inboard of, the crown 56' of disc 212. Joint 220 includes a relatively large, circumferentially continuous weld bead 230 preferably formed by MIG welding techniques at the inboard side of the disc parts and indicated semi-schematically in FIG. 6. A portion of the end face 228 of flange 224 projects radially inwardly from flange 222, and if desired may be utilized to help position an additional weld bead in this area. However, tests have shown that joint 220 utilizing the single weld 230 fully meets O.E.M. passenger car wheel fatigue test requirements. Hence end face 222 may be left free to serve as a convenient attachment structure for a removable hub cap.

It will be seen that the aforementioned advantages of wheel 110 also accrue to wheel 200, as demonstrated by successful tests on an experimental prototype embodying the construction of wheel 200 of FIGS. 6–8. Thus, wheel 200 is presently preferred over wheel 110 since it appears to have greater fatigue strength, as well as having only one weld at joint 220, no outboard side weld and is readily configured for removable hub cap attachment.

Third and Fourth Embodiments

Figure 9:
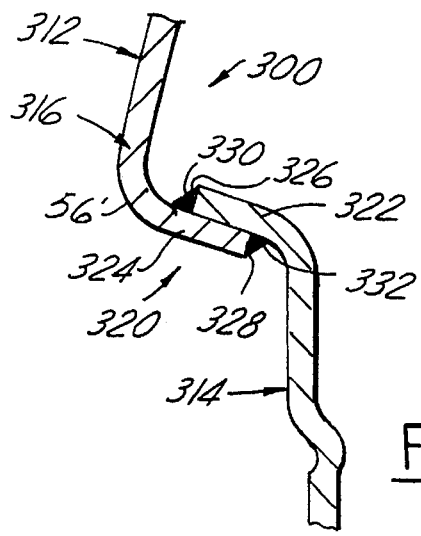
FIGS. 9, 10, 11, 12, 13 and 14 are fragmentary radial cross-sectional views illustrating respectively third, fourth, fifth, sixth, seventh and eighth embodiments of wheel constructions of the invention, each taken in section in the manner of FIGS. 3 and 6.
Figure 10:
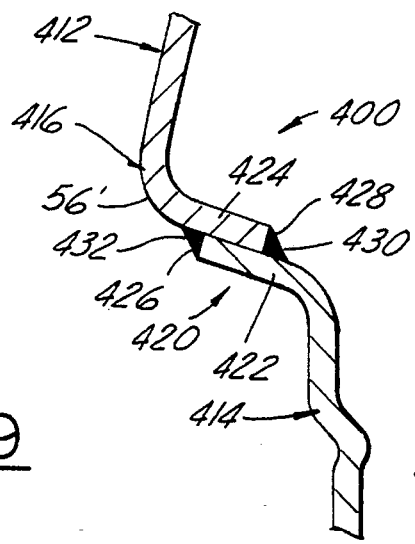

FIGS. 9 and 10 illustrate respectively third and fourth embodiments of the wheels 300 and 400 made in accordance with the method and construction of the present invention. Wheels 300,400 are constructed generally in accordance with the methods and apparatus described previously in conjunction with wheel 110. Wheels 300 and 400 differ from wheels 110 and 200 in that both employ fully overlapped-type joint constructions but which are the reverse of each other. Hence only the particulars of the respective interconnecting joints 320, 420 of the center parts 314, 414 and disc outer parts 316, 416 of wheels 300, 400 are illustrated in FIGS. 9 and 10 with respect to these embodiments.

As shown in FIG. 9, outer disc part 316 of disc 312 is provided with a in-turned frusto-conical flange 324 which protrudes inboard from crown 56' a greater distance than flange 124 of wheel 110 and terminates at an as-stamped, unfinished end face 328. The frusto-conical flange 322 of disc center part 314 is suitably designed and dimensioned to telescopically outside overlap flange 324 in assembly, and likewise may have an as-stamped unfinished end face. Alternatively, and as shown in FIG. 9, end face 326 is provided with a beveled end face 326 machined or otherwise formed to generally fit into the inboard radius of crown 56'. Joint 320 which permanently joins parts 314 and 316 also includes a circumferentially continuous inboard fillet weld 330 (indicated semi-schematically in FIG. 9) applied generally at the junction of flange end face 326 and the respectively adjacent inboard side surfaces of disc outer part 316 at and radially outwardly of crown 56'.

Referring to FIG. 10, wheel 400 features an inside overlap of the flange 422 of center part 414 with flange 424 of disc outer part 416, flange 422 being suitably redesigned for this form of overlap. Again the end faces 426 and 428 of flanges 422 and 424 may be as-stamped, unfinished edges. The permanent connection of disc parts 414 and 416 embodied in joint 420 of wheel 400 is provided by a pair of circumferentially continuous inboard and outboard fillet welds 430 and 432 at the junction of flange edges 428 and 426 and the respectively adjacent surfaces of flanges 422 and 424.

Although the construction of the respective joints 320 and 420 of wheels 300 and 400 inherently require more material in disc outer parts 316 and 416 relative to disc 212 and 112 described previously, the elimination of machining operations at the flange end faces of the joints helps compensate for the added material cost. In addition, larger or looser dimensional tolerances may be employed in the specifications of the flanges 322, 324, 422 and 424 because of the telescopic nature of joints 320 and 420. The conical geometry of the telescopic overlapping joints 320 and 420 is preferably designed to have a press fit when the two parts are pushed together to their final assembled position illustrated in FIGS. 9 and 10. The limited mutual flexure provided by the overlapped joint flanges imparts a desirable pre-stress and also accommodates looser tolerances in the flange angles, resulting in further manufacturing economies in this respect.

The precise final assembled relationship of the center and outer parts 314, 316 and 414 and 416 may be established by suitable design of the conventional assembly welding fixture utilized in assembling and welding of these two parts. Hence if discs 312, 412 are to be pre-assembled to make a disc sub-assembly, the mounting pad plane 100' of the center part is precisely located relative to the plane of the inboard surface of the bead retaining flange 60' of the outer disc part 316, 416. Alternatively, if disc outer parts 316, 416 are to be joined first to rim 12 to form a rim-partial disc subassembly, the mounting pad plane 100' is precisely located in parallelism relative to the average planes of the rim bead seats to minimize wheel lateral runout. The fully overlapping nature of joints 320 and 420 also lends itself, if desired, to other fastening modes, such as spot welding, riveting, friction and inertia welding, laser welding, etc. (not shown).

Wheel 400 as shown in FIG. 10 also illustrates the aforementioned feature of utilizing thicker sheet material in the disc inner part or "mounting cup" 414 than that in disc outer part 416. This selectable material-thickness variation feature, of course, may also be utilized in the other embodiments of the wheel constructions of the invention as shown herein, and also may be reversed, i.e., the disc outer part being made of thicker sheet material than the disc inner part.

It now will be understood from the foregoing description that the modified wheels 300 and 400 of the present invention, in addition to their above advantages, also provide the aforestated advantages of wheel 110, such as adaptability to variable offset requirements, strength-to-weight optimization, manufacturing economies, etc.

Fifth and Sixth Embodiments

Figure 11:
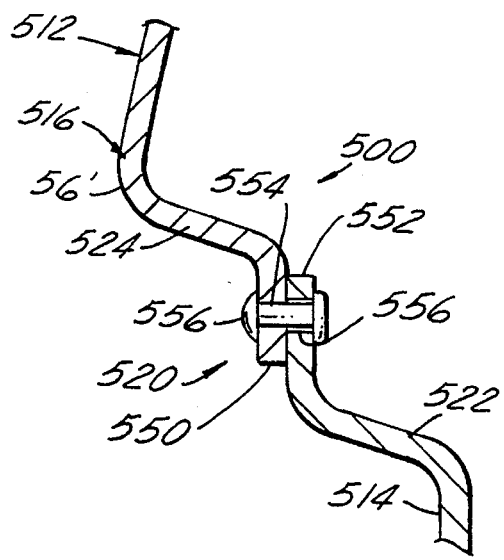
Figure 12:
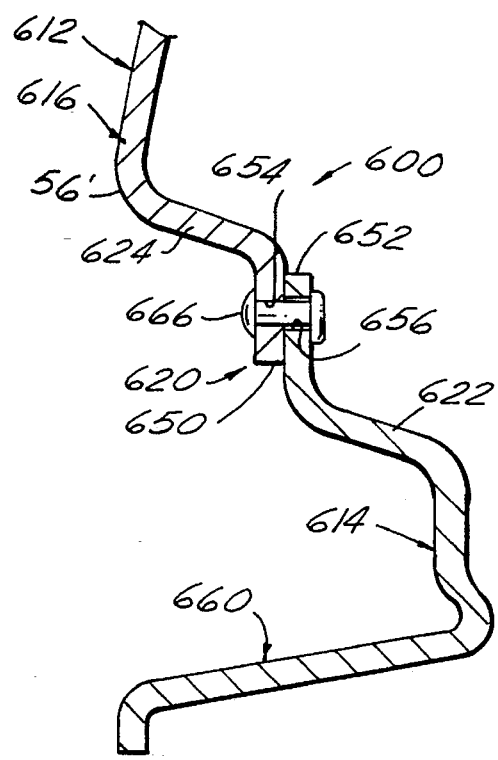

FIGS. 11 and 12 respectively fragmentarialy illustrate fifth and sixth embodiments of wheels 500 and 600 also constructed in accordance with the present invention. Referring to FIG. 11, outer part 516 of disc 512, also has an in-turned flange 524 of frusto-conical geometry converging inboard of the wheel. However, flange 524 terminates in a radially inwardly extending, flat circular flange portion 550. Center part 514 likewise has a frusto-conical flange portion 522 divergent in an outboard direction which terminates in a radially outwardly extending, flat circular flange portion 552 adapted to axially overlap flange 550 in assembly. Flanges 550 and 552 are each respectively provided with a circular row of assembly holes 554 and 556 located to register in assembly. Parts 514 and 516 are permanently interconnected by means of rivets 556 having their shanks first inserted through the registering flange assembly holes, and then upset and cold headed from either the inboard or outboard side of the assembly by a suitable conventional riveting fixture.

Wheel 600 of FIG. 12 is identical to wheel 500 except that the center mounting part 614 is provided with a central "dixie-cup" portion 660 similar to the hubcap-simulating cone or "dixie-cup" 32 of the mounting portion of the wheel construction disclosed in U.S. Pat. No. 4,917,440.

The riveted connecting joints 520 and 620 respectively of wheels 500 and 600 thus are in the nature of mechanical lap joints. It is to be understood that other forms of mechanical fastening means, such as threaded fasteners and associated nuts, may be substituted for rivets 556 or 666. Likewise, joints 520 and 620 may be united permanently by other fastening systems such as spot welding through the overlapping flanges, or even by fillet welds at the edges of the flanges in the manner of wheels 300 or 400. However, mechanical type connections for joints 520 and 620 are advantageous when the center parts 514, 614 and outer disc parts by 516 or 616 are made from dissimilar materials which pose welding joinder and material denigration problems, e.g., aluminum-to-steel.

Wheels 500 and 600 may be made and assembled in the sequence described previously in conjunction with wheel 110 and finished by after-assembly mounting hole forming operations as well as coin-after sizing operations. This enables accurate formation and location of the axes of the wheel mounting holes radially of the wheel relative to the average axis of the bead seats of the wheel, either on-center or with controlled eccentricity as set forth in the aforementioned Daudi et al '287 and '407 patents.

Alternatively, a conventional "finish-before" manufacturing sequence may be employed with respect to the center parts 514 and 614, these parts thus being completely precision formed and finished prior to assembly to the respective outer disc parts 516 and 616. In this event the assembly holes 554, 556 and 654, 656 of wheels 500 and 600 respectively may be precision finished formed in separate and diverse part making operations.

Moreover, one of these sets of assembly holes 554, 556, 654, 656 may be made slightly oversize diametrically with respect to the other set of assembly holes in accordance with the methods and constructions of the invention disclosed and claimed in co-pending U.S. application Ser. No. 08/031,272, filed Mar. 15, 1993, now U.S. Pat. No. 5,380,071 in the name of Charles E. Kier, Jr., assigned to the assignee of record and incorporated by reference herein. In accordance with such method all three pieces of the full face wheels 500 and 600 are finished formed prior to assembly, including the assembly holes in the two disc parts as well as the wheel mounting bolt holes and pilot center opening in the disc center parts 514 and 614. The diametrically smaller set of the assembly holes is sized to receive the shank of the rivet with a press fit. If desired the rivets can be preassembled to that one of the disc parts containing the smaller assembly holes.

Then outer disc part 516 or 616 is permanently secured to the associated rim 12, such as by the weld joint 16 as described previously in conjunction with wheel 110. Next the subassembly of rim 12 and outer disc part 516, 616 is fixtured, preferably by clamping the rim bead seats. The disc center part 514, 616 is then assembled to outer disc part 516, 616 so as to bring their respective flanges 550, 552 and 650, 652 into overlapping flat contact with the shanks of the pre-assembled rivets inserted through the larger diameter assembly holes. Prior to rivet cold heading, the difference in diametrical dimensions of the two sets of assembly holes thus provides a predetermined clearance for laterally bodily shifting center parts 514, 614, radially of wheels 500, 600 relative to the fixtured rim and disc outer part subassembly.

In the next operation, center part 514, 614 is engaged by a conical centering mandrel (not shown) inserted in the precision finished center part pilot opening 42' and the center part thereby bodily shifted laterally by the mandrel radially of the wheel as needed to bring the axis of the mounting bolt holes and/or center pilot opening either coincident with the average axis of the rim bead seats, or to impart the aforementioned controlled eccentricity for match mounting. After the center part 514 is thus precisely located radially relative to the rim and disc outer part subassembly, the rivets 556, 666 are cold formed to fill the assembly hole clearances and form in-situ the second rivet heads to thereby securely unite the disc center part with the outer part disc and rim subassembly.

Since connecting joints 520 and 620 are disposed radially inwardly of the disc crown 56' they may be readily covered from view with a removable hub cap. In the event that wheels 500 or 600 are to be employed as the "backbone" of a "POLYCAST" wheel as described previously, the outboard covering of decorative urethane molded in-situ to the outboard face of the wheel can be utilized to cover joints 520 and 620, if desired.

Again, from the foregoing description it will now be understood that wheels 500 and 600 fulfill the objects and obtain the aforestated advantages previously described with respect to wheel 110, as well as providing the foregoing additional features offering further advantages in many vehicle wheel applications.

Seventh Embodiment

Figure 13:
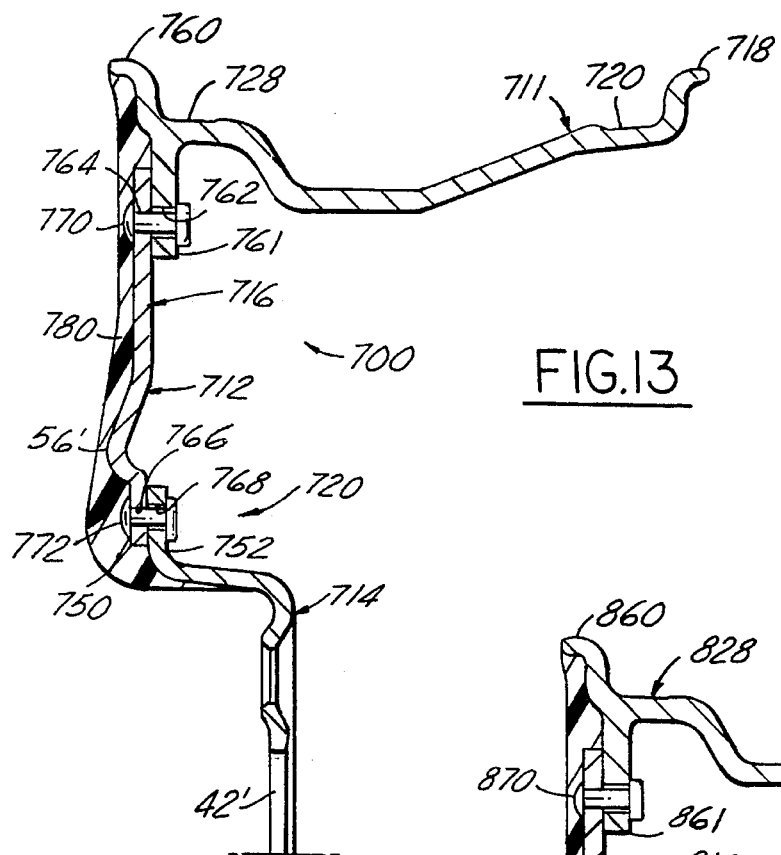

Referring to FIG. 13, the foregoing principles of the two-part disc construction of the present invention may also be advantageously applied to a wheel 700 which has a cast, forged, extruded or mill hot rolled aluminum or magnesium "full-rim" 711, i.e., dual bead seats 720 and 728 and dual tire bead retaining flanges 718 and 760, as well as a radially inwardly extending integral mounting flange 761 provided with a circular row of assembly holes 762. Wheel 700 also has a two-part disc 711 made up of outer disc part 716 and a center disc part 714. A first circular row of assembly holes 764 is provided near the outer edge of disc part 716 oriented for registry with rim flange assembly holes 762. One set of these assembly holes may be made diametrically oversize relative to the other as set forth previously. Outer disc part 716 also has a second circular row of assembly holes 766 in a radial flange 750 thereof oriented for registry with a circular row of assembly holes 768 provided in a radial flange 752 of center part 714 which radially overlaps flange 750 in assembly. Rim 711 is permanently secured to outer disc part 716 by fasteners such as rivets 770, and outer disc part 716 is likewise secured to disc center part 714 by rivets 772.

In constructing wheel 700, rim 711 may be first assembled to a disc part 716, and then this subassembly assembled to disc center 714 in the manner of constructing wheels 500 or 600. In this event only the sets of assembly holes 766 and 768 need to be sized to provide assembly shifting clearance. Alternatively, disc center part 714 can be preassembled to disc part 716 and the joint construction 720 formed in this operation. The two-part disc subassembly then may be assembled to rim 711 utilizing the shift clearance feature provided by assembly holes 762 and 764. Either procedure achieves the desired alignment of the axis of the wheel mounting and/or pilot holes in center part 714, radially of the wheel, with the average axis of the rim bead seats 720, 728.

Utilizing the construction of wheel 700, diverse materials and methods can be employed in the separate manufacture of its component parts. Rim 711 may be cast, forged, extruded or mill hot rolled from light metal alloys of aluminum and/or magnesium and, if required, machined to finished form. Outer disc part 716 may be progressively die stamped and formed from sheet metal material such as mild carbon or HSLA steel, or a suitable aluminum alloy. Disc center part 714 may be die stamped or formed from stainless steel sheet material to provide heat isolation between the wheel hub or brake components and outer disc part 716, as well as a corrosion free mount for the wheel on a vehicle to eliminate "rust-on" problems well known in the industry. Changes in wheel disc contour as well as wheel offset can be accomplished by alteration of the individual parts at greatly reduced tooling costs. The greater choices available in material selection and thickness for each of the component parts can be utilized to provide a wheel having an improved strength-to-weight ratio at reduced cost.

Eighth Embodiment

Figure 14:
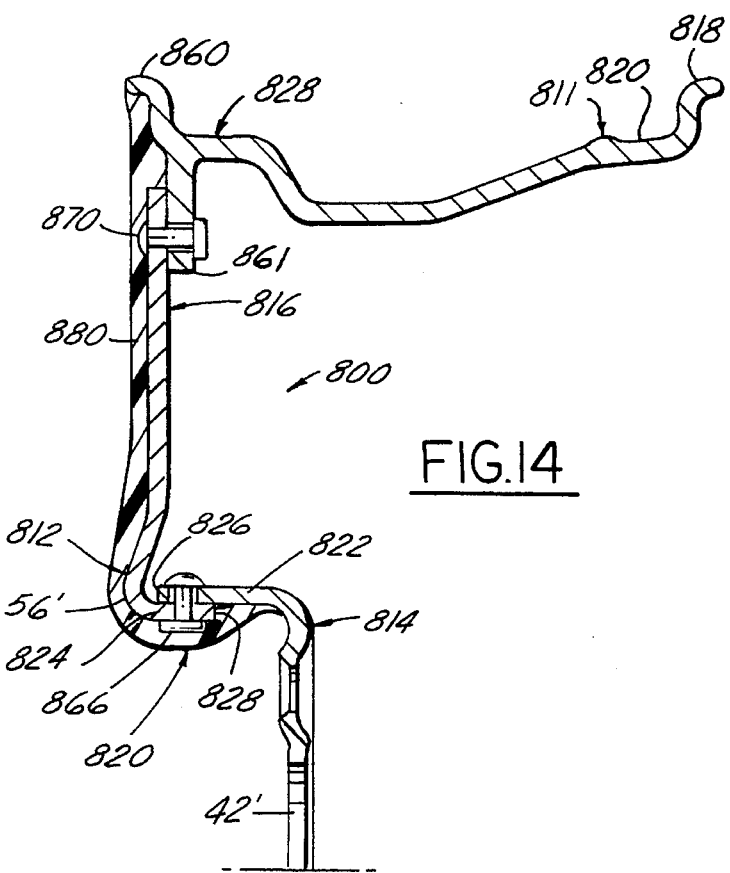

FIG. 14 illustrates an eighth embodiment wheel 800 of the invention utilizing a full rim 811 which may be identical to rim 711. Wheel 800 also has a two-part disc consisting of an outer disc part 816 and a central mounting part 814. Rim 811 is permanently connected via flange 861 by rivets 870 to outer disc part 816 to form a radial fully overlapping type-joint in the manner of wheel 700. However, wheel 800 differs from a wheel 700 in that outer disc part 816 is permanently connected to center part 814 by an axial rather than radial overlapping-type joint 820.

Thus in wheel 800 disc part 816 has a radially in-turned second flange 824 providing a cylindrical, radially outer surface adjacent its inner edge 828. Disc center part 814 likewise has a radially out-turned flange 822 which extends in an outboard direction and likewise has a cylindrical inner surface adjacent its outer edge 826 adapted to telescope slidably with a close or press fit over the cylindrical surface of flange 824 to form the telescopic joint 820. Alternatively, the slidable interengagement surfaces of flanges 824 and 822 may have slight cone angles complementary to one another similar to that of joint 320 of wheel 300 but of smaller magnitude, say on the order of 5°, to facilitate telescopic engagement utilizing looser part tolerances but designed for a press fit when fully engaged. The connection of center disc part 814 to outer part 816 via joint 820 is preferably made by a circular array of rivets 866.

If desired, the assembly holes for rivets 870 in flange 860 of rim 811, and likewise the assembly holes for rivets 866 in flange 822 of the center part 814, may be made diametrically slightly larger than the corresponding sets of assembly holes in disc part 816. With this two-axis dual joint construction assembly fixture bodily shifting of outer disc part 816 and center part 814 relative to rim 811 radially of the wheel 800 can be utilized to precisely locate these parts radially of wheel 800 during assembly thereof. Likewise, assembly fixture bodily shifting of center part 814 axially of wheel 800 can be utilized to precisely locate its mounting plane relative to the bead seat center plane of rim 811 during assemlby of these parts. Moreover, both alignment shifts can be accomplished in one operation. Rivets 870 and 866 are preferably inserted shank-first with a press fit through the smaller set of assembly holes in the respective parts prior to such fixture shifting. After shifting of the parts to final location, the rivets are engaged by the riveting apparatus to in-situ form the free ends of the rivet shanks into second rivet heads as described previously.

More particularly, utilizing this two-axis dual joint construction of wheel 800, the three wheel parts 811, 814 and 816 are loosely or movably interengaged and partially restrained for limited relative movement by the press fit rivets 870 and 866. This "loose" three part assembly then may be outside fixtured by jaws (not shown) engaging the bead seats 820 and 828 of rim 812 to position the same on a known machine axis. Center part 814 is engaged by a conical locating mandrel (not shown) inserted into the finished center pilot opening 42' to locate the axes of bolt hole circle and center pilot opening in the aforementioned predetermined manner, radially of the wheel, relative to the rim bead seats. A suitable back-up die block (not shown) may then be moved into the inboard side of the loose wheel assembly to engage the inboard ends of the shanks of rivets 870. This die block may also have a slightly conical center opening which telescopes over and embraces the radially outer ends of rivets 866. With the loosely united three part wheel assembly thus fixtured, located and backed up, the mounting plane of center part 814 is also oriented in a predetermined manner, either parallel or non-parallel to the center plane 104' of wheel 800, by a corresponding engaging surface abutment of its mounting pads with a locating surface provided on the back up die insert.

Rivets 870 are then final formed and swagged in permanent fastened relationship with parts 812 and 816 by engaging the outboard ends of rivets 870 with a riveting fixture (not shown) movably axially of wheel 800 against the rivets from the outboard side of the wheel to perform either gang riveting or sequential riveting. Likewise, rivets 866 may be gang riveted by insertion of a conical mandrel (not shown) axially from the outboard side of the wheel so as to simultaneously engage all rivets 866 and force them against the backup die block cone surrounding the inboard ends of the rivets to thereby deform the rivets and cold head the same by the wedging action between the riveting cone and the back-up cone.

This fixturing and final assembly set-up thus also lends itself to being designed to orient the mounting pads 100' of center part 814 and their plane 102' to compensate for lateral run-out of the rim bead seats somewhat in the manner of the method and apparatus disclosed and claimed in U.S. Pat. Nos. 4,646,434; 4,733,448 and 4,815,186 issued in the name of Anwar R. Daudi and also assigned to the assignee of record herein. Hence wheel 800 constructed and assembled as described above may be made with precise predetermined control of both radial and lateral run-out. The wheel thus can be made precisely "on-center" or made with predetermined and controlled eccentricity for radial match-mounting to a measured and marked tire. Likewise, the first harmonic of wheel lateral run-out can be minimized, or a predetermined known quantity of the same can be imparted to the wheel at a given identified location for lateral match-mounting to tire measured and marked for the high point or low point of first harmonic of lateral run-out.

It is to be understood that each of the components of wheels 500, 600, 700 and 800, namely the rim, outer disc part, and center disc part, are each made as separate items to final form as precision parts so that little or no after-assembly forming operations, such as machining or punching, are required. Likewise, no joint welding operations need be employed unless desired. Hence a wide selection of materials and thicknesses for each of the components is available to best meet the individual needs and functions of each portion of the wheel in terms of their individual roles in performing the wheel load supporting function between a tire and a vehicle.

The foregoing construction and method of making wheels 110-800 also lends itself to designing "backbone" metal wheels for use in making "POLYCAST" wheels wherein a decorative layer of a urethane composition or other plastic material such as layers 780 and 880 (FIGS. 13 and 14) is applied by molding or other methods of coating against the outboard face of one or more of the three parts of the wheel assembly. If desired, and as illustrated in FIGS. 13 and 14, layers 780 and 880 can be molded respectively to cover the outboard surfaces of rims 712 and 812, outer disc parts 716 and 816 as well as a portion of center parts 714 and 814 to thereby also hide the rivets 770, 766, 870 and/or 866.

It will also now be understood that wheels 300, 400, 500, 600, 700 and 800 can utilize alternative fastening systems. For materials presenting welding joint problems, mechanical fastening systems are preferred, such as rivets or threaded fasteners. For readily weldable materials, weld fastening systems such as arc welding, spot welding, continuous seam resistance welding, laser welding, friction or inertial welding, etc., may be chosen to best suit a given wheel design and/or application, as will be well understood by those skilled in the art in view of the foregoing disclosure.

From the foregoing description, it will now be apparent that the present invention provides a full face styled wheel of multi-part, non-take-apart, metal construction which amply fulfills the aforestated objects and offers many advantages, including those set forth above. The individual wheel components may be made and assembled using conventional mass production tool manufacturing equipment and processes operable at high wheel production line rates. A wide variety of styling effects can be imparted to the beauty side of the wheel, either by the outboard metal surfaces of the component parts or by utilizing the metal components as the "backbone" of the "POLYCAST" wheel construction, while achieving manufacturing adaptability to a wide range of wheel offsets in the construction.

The foregoing wheels 110, 200, 300, 400, 500, 600, 700 and 800 illustrative of the present invention thus represent improved wheel cosntructions over the previously described full-face wheel 10 of FIGS. 1 and 2, as well as over the full-face wheel construction disclosed in Heck et al U.S. Pat. No. 5,188,429 and the base wheel type constructions disclosed in British patent 445,642 and in American Racing Equipment Wheel Part. No. 72-4604 (as referenced in Heck et al 5,188,429).

In accordance with the present invention, it has been found that despite the different stress loads imposed in a full-face type wheel constructions, one piece of the box-like, two-layer three piece disc center construction of the Heck et al '429 patent and British patent 445,642 can be eliminated, i.e., part 38 of Heck et al and part 20 of British patent 445,642. In addition, the disc outer part and disc center or mounting cup part need not both be made of the relatively heavy and same gauge sheet stock thicknesses as illustrated in Heck et al 5,888,429 and in the aforementioned ARE Part No. 72-4604 base-type wheel. It is believed that forming the full-face outer disc part with a hat-section crown 56' and a reversely curved annular in-turned portion, such as flanges 124, 224, 324, 424, 524, 624, leading into the disc outer-inner part joint 120, 220, 320, 420, 520, 620, 720 or 820, contributes to these improved results in providing a solely two-piece disc suitable for a full-face type wheel of the invention.

It is also to be understood that, although the foregoing description and drawings describe and illustrate in detail various preferred embodiments of the present invention, to those skilled in the art to which the present invention relates the present disclosure will suggest many modifications and constructions as well as widely differing embodiments and applications without thereby departing from the spirit and scope of the invention. The present invention, therefore, is intended to be limited only by the scope of the appended claims and the applicable prior art.

I claim:

1. A method of constructing a multi-piece, non-take-apart vehicle wheel assembly of the type comprising a single piece drop-center-well rim having an inboard bead seat and an outboard bead seat for mounting of a pneumatic tire thereon, said rim having disc mounting means affixed thereto and extending radially inwardly of the rim, and a wheel mounting disc having a center mounting portion with a center pilot opening and a circular row of wheel mounting bolt holes encircling said center pilot opening for receiving wheel mounting fasteners for fixing said wheel to the wheel mounting structure of a vehicle, said disc having an outer peripheral portion radially overlapping said disc mounting means of said rim in assembly therewith, said disc also having an intermediate window vent opening portion disposed radially between said disc center portion and said outer peripheral portion, said method comprising the steps of:

(1) finish forming said rim as a separate part to final dimensions;

(2) finish forming said disc outer and intermediate portions as a separate part to final dimensions with an annular connector flange formed at the inner periphery thereof;

(3) forming said center portion as a separate part with a connector flange formed at the outer periphery of the outboard side thereof and mounting plane means formed at the inboard side thereof;

(4) permanently interconnecting said disc outer and intermediate part with said rim part to form a rim and partial disc subassembly;

(5) fixturing said subassembly on an assembly apparatus to orient the average axis of the bead seats of said rim on a predetermined first axis of said apparatus, (6) temporarily assembling said subassembly and said center part by placing said center part on said subassembly with said connector flanges movably engaged with one another;

(7) precision locating said center part relative to said rim by engaging a locating means of said apparatus with said center part to align said center part in a predetermined orientation relative to said rim bead seats by bodily shifting of said center part as and if necessary relative to the rim to accomplish said alignment; and (8) and permanently assembling said center part and subassembly in permanent fixed relationship while located as established in Step (7) by permanently securing said connector flange of said center part and subassembly together in a non-take-apart mode whereby final permanent assembly of said center part and subassembly provides a final predetermined permanently fixed orientation said center part relative to said rim bead seats.

2. The method as set forth in claim 1 wherein step (3) further comprises finish forming said center part to final dimensions with said center pilot opening and bolt holes finished formed therein, and step (7) further comprises engaging said locating means with said center part bolt holes and/or said center pilot opening to align the axes the circle of said bolt holes and said center pilot opening on a predetermined second axis of the apparatus whereby in step (8) said axes of said bolt holes and center pilot opening are fixed in said orientation.

3. The method set forth in claim 2 wherein said first and second axes of the apparatus are coincident.

4. The method set forth in claim 2 wherein said second axis is eccentric to said first axis by a predetermined amount and in a predetermined direction.

5. The method as set forth in claim 1 wherein step (3) further comprises finish forming said center part mounting plane means to final dimensions, and step (7) further comprises engaging said locating means with said center part such as to align said center part mounting plane means in a predetermined orientation relative to the average plane of the rim bead seats.

6. The method as set forth in claim 5 wherein said mounting plane means is aligned parallel to the average plane of the rim bead seats.

7. The method as set forth in claim 5 wherein said mounting plane means is aligned non-parallel to the average plane of the rim bead seats by a predetermined amount and in a predetermined direction.

8. The method set forth in claim 5 wherein step (4) is performed concurrently with steps (5) through (8) and said disc outer and intermediate part and said rim part are temporarily assembled together and movable relative to one another during step (7) and permanently assembled in step (8).

* * * * *

UNITED STATES PATENT AND TRADEMARK OFFICE
CERTIFICATE OF CORRECTION

PATENT NO. :   5,551,151
DATED      :   September 3, 1996
INVENTOR(S) :  Joseph C. Overbeck It is certified that error appears in the above-indentified patent and that said Letters Patent is hereby corrected as shown below:

On the title page, item [62] should read:

[62] Division of Ser. No. 165,079, Dec. 10, 1993, Pat. No. 5,380,071.

Signed and Sealed this

Third Day of December, 1996

Attest:

BRUCE LEHMAN

Attesting Officer    Commissioner of Patents and Trademarks